W. H. Taylor,
Screening and Weighing Device.
No. 57,407. Patented Aug. 21, 1866.
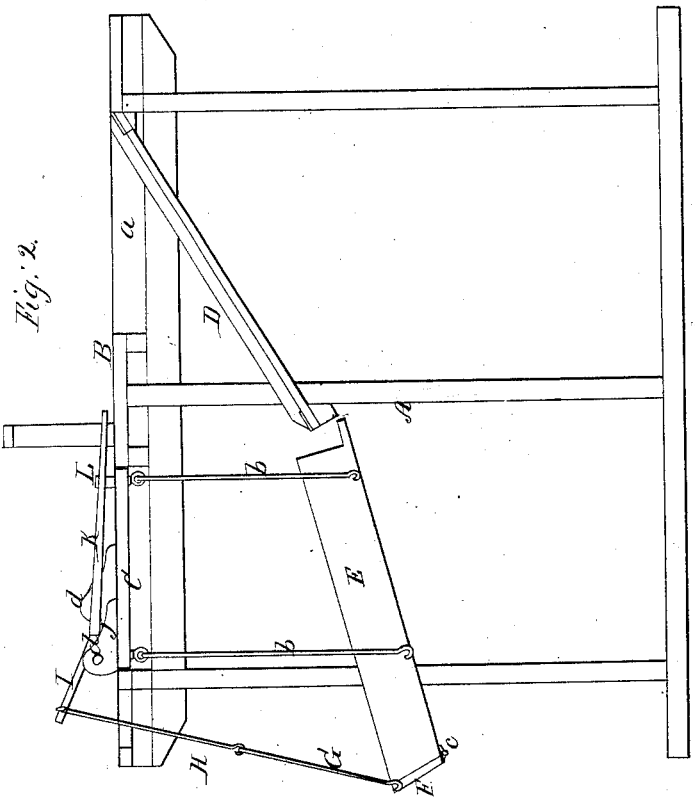
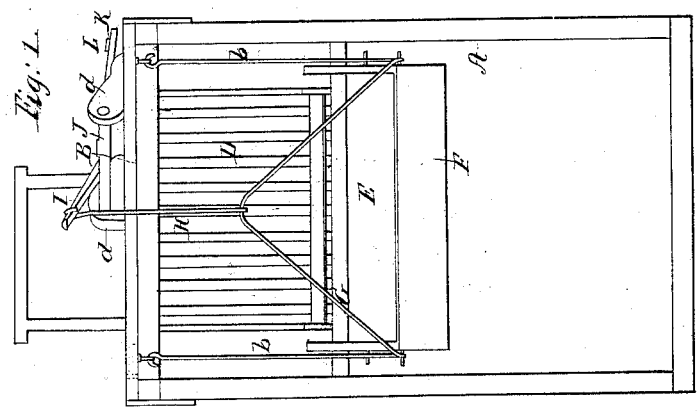
Witnesses:
Inventor:

UNITED STATES PATENT OFFICE.

W. H. TAYLOR, OF PITTSBURG, PENNSYLVANIA.

COMBINED SCREEN AND WEIGHING DEVICE.

Specification forming part of Letters Patent No. 57,407, dated August 21, 1866.

*To all whom it may concern:*

Be it known that I, W. H. TAYLOR, of Pittsburg, Allegheny county, State of Pennsylvania, have invented a new and useful Combination of a Screening and Weighing Device; and I do hereby declare that the following is a full, clear, and exact description thereof, which will enable others skilled in the art to make and use the same, reference being had to the accompanying drawings, forming part of this specification, in which—

Figure 1 is an end view of my invention; Fig. 2, a side sectional view of the same, taken in the line $x\ x$, Fig. 1.

Similar letters of reference indicate like parts.

This invention relates to a new and useful combination of a screening and weighing device, for the purpose of screening and weighing simultaneously or at one operation, coal, limestone, and other similar substances as they are delivered on shipboard or put into vehicles to be transported to the place where they are to be used.

The object of the invention is to economize in labor and time, now largely expended in manipulation for screening and weighing heavy substances of the kind specified.

A represents a framing of any suitable construction, on which a platform, B, is secured, and C represents the platform of an ordinary platform weighing-scales, said platform working in a square recess in the platform B of the framing A.

D represents an inclined screen, the upper end of which is screwed to one side of an opening, $a$, in the platform B, the substance to be screened and weighed being dumped upon the screen through said opening $a$.

E represents a trough, which is also inclined, and is suspended from the platform C of the scales by rods $b$, the upper end of the trough being close to the lower end of the screen, so as to receive the substance from the latter.

The trough E is provided at its lower end with a door, F, the lower edge of the latter being connected to the lower edge of the bottom of the trough by hinges $c$, one or more, and said door has a bail, G, attached to it, which bail is connected by a rod, H, with an arm, I, attached to a shaft, J, the bearings $d$ of which are attached to the platform C of the scales. The shaft J also has an arm, K, extending from it, and this arm is held down by a button, L, on the platform C, in order to keep the door F in a closed or upward position when required.

The operation is as follows: The substance to be screened and weighed is dumped or thrown upon the screen D through the opening $a$ in the platform B of the framing A, and passes down said screen by its own gravity, the fine particles passing through the screen and the large particles passing into trough E, where they are weighed by the scales, to which the platform C is connected. When the contents of the trough E are weighed the arm K is released by turning the button L off from it, and the door F opens and the contents of the trough are discharged. The door F is then raised and closed against the lower end of trough E, the arm K screwed down by the button L, and the operation repeated.

Thus by this simple arrangement coal and other substances may be screened and weighed simultaneously, and a vast deal of labor and time saved thereby.

Having thus described my invention, I claim as new and desire to secure by Letters Patent—

The inclined screen D, in combination with the trough E, suspended from the scales-platform C, and provided with the door F, all arranged with a suitable framing, A, to operate in the manner substantially as and for the purpose herein set forth.

W. H. TAYLOR.

Witnesses:
    J. C. BROWN,
    G. M. ALEXANDER.